(12) United States Patent
Sussman

(10) Patent No.: US 7,599,855 B2
(45) Date of Patent: Oct. 6, 2009

(54) SYSTEM AND METHOD FOR A COMPLETE AND CONVENIENT SHOPPING EXPERIENCE

(76) Inventor: Lester Sussman, 9213 Bulls Run Pkwy., Bethesda, MD (US) 20817

( * ) Notice: Subject to any disclaimer, the term of this patent is extended or adjusted under 35 U.S.C. 154(b) by 224 days.

(21) Appl. No.: 09/781,698

(22) Filed: Feb. 13, 2001

(65) Prior Publication Data
US 2002/0161658 A1    Oct. 31, 2002

(51) Int. Cl.
*G06F 17/60* (2006.01)
(52) U.S. Cl. ........................................... 705/26
(58) Field of Classification Search ................... 705/26, 705/27, 16
See application file for complete search history.

(56) References Cited

U.S. PATENT DOCUMENTS

| | | | | |
|---|---|---|---|---|
| 5,424,524 | A * | 6/1995 | Ruppert et al. .................. | 705/8 |
| 5,483,472 | A * | 1/1996 | Overman ..................... | 708/110 |
| 5,884,281 | A * | 3/1999 | Smith et al. .................... | 705/26 |
| 6,129,274 | A * | 10/2000 | Suzuki ......................... | 235/381 |
| 6,129,276 | A * | 10/2000 | Jelen et al. ................... | 235/383 |
| 6,204,763 | B1 * | 3/2001 | Sone ......................... | 340/568.1 |
| 6,370,513 | B1 * | 4/2002 | Kolawa et al. ................ | 705/10 |
| 6,493,110 | B1 * | 12/2002 | Roberts ....................... | 358/1.2 |
| 2002/0008621 | A1 * | 1/2002 | Barritz et al. ............. | 340/572.1 |
| 2003/0061113 | A1 * | 3/2003 | Petrovich et al. .............. | 705/26 |
| 2003/0105682 | A1 * | 6/2003 | Dicker et al. .................. | 705/27 |

* cited by examiner

*Primary Examiner*—F. Zeender
*Assistant Examiner*—Mussa Shaawat

(57) ABSTRACT

A method and system whereby a consumer creates a shopping list using a portable barcode scanner and an intelligent base-station. The entered barcodes are downloaded to the base-station from the barcode scanner. The base-station retrieves related barcode information from a barcode database via the Internet. The barcode database can belong to a merchant, or a generic shopping service.

The base-station can be a consumer's computer, or some other smart electronic device. The base-station maintains a predictive shopping list database for all barcodes entered via the barcode scanner. The database learns the shopping consumption habits of the consumer over a period of time and ensures that when the consumer is ready to shop no previously needed, but currently forgotten, items are left off of the shopping list.

The consumer uses this method to shop in a store, or via Mail-Order/Telephone-Order or on the internet using the created shopping list.

18 Claims, 2 Drawing Sheets

SYSTEM AND METHOD FOR A COMPLETE AND CONVENIENT SHOPPING EXPERIENCE

BACKGROUND OF THE INVENTION

Today shoppers have a number of choices to shop for and to buy merchandise.

The usual way is for a consumer to go to a store, with or without a shopping list, locate the required items on the store's shelves, purchase them and then take the items home, or to work.

The first major evolution of shopping was the mail order catalog, which was first established in Chicago by Aaron Montgomery Ward and his brother-in-law George R. Thorne. By 1904, three million catalogs weighing 4 pounds each were being mailed to consumers. The next step in the shopping experience evolution was the advent of telephone catalog ordering.

Today these two shopping methods have been combined into a method called MOTO, i.e. Mail Order/Telephone Order. The MOTO purchasing model has a consumer browse a catalog that was mailed to the consumer; the consumer calls the mail order house's phone number and purchases the selected item, usually with a credit card. The merchandise is shipped to the consumer.

A recent historical evolution for shoppers occurred when the Internet exploded on the marketplace around about 1996. The current terminology for this method of consumer shopping is called e-commerce and B2C (i.e. Business To Consumer). According to the October 2000 report by NetValue (www.netvalue.com), 74.2 percent of the 52 million Internet connected US households visited an e-commerce web site. 40.6 percent of these households connected using a secure connection. This usually implies that a purchase was made or was considered over the Internet. The e-commerce shopping model is similar to the MOTO model, i.e. a consumer browses an online catalog, purchases the selected item with a credit card and the merchandise is shipped to the consumer. Various retailers have adopted this business model, e.g. groceries can be ordered online and delivered to a consumer. Examples of these grocery businesses include WebVan and Peapod. Other consumer e-commerce sites include Amazon.com and StoreRunner.

According to an Aug. 11, 2000 US Census Bureau news release, in 1997 sales of all kinds of merchandise from electronic shopping (e.g. via the Internet) and mail-order houses sold $79 billion of goods. Computer hardware, software and supplies accounted for 29 percent; clothing and footwear, 15 percent; and drugs, health aids and beauty aids, 13 percent. Details of this 1997 US Census Bureau report can be found on the Internet at www.census.gov/epcd/www/econ97.html.

Another interesting consumer shopping business model is the one from Qode Inc. (www.qode.com) This model has consumers scanning in Uniform Product Code (UPC) bar codes with a portable device called a Qoder. The bar codes are then transferred via a Qoder "base-station" device attached to the keyboard port on a PC. The bar codes are then uploaded to the Qode web site on the Internet and into a consumer's personal directory. Qode then searches for online deals and special promotions, or provides the nearest stores to the consumer that sells the scanned products. Qode is working on extending the means by which the consumer accesses their pricing web site, e.g. by manually entering the bar code via a cell phone or regular phone. A similar methodology is claimed by BarPoint.com (www.barpoint.com), which claims to have a patent pending on "search engine technology to allow businesses and consumers to use the UPC barcode number that appears on more than 100 million retail items to instantly obtain detailed product and price information from the Internet . . . . This information includes detailed product descriptions, comparative prices, links to order the product from vendor partners, product reviews, manufacturer contact information and much more.". Problems with this system include forcing the consumer to connect to a central site to obtain a list of the scanned in bar codes and their description. Furthermore the keyboard interface requires specialized device drivers to be written for each personal computer (PC) operating system, e.g. MS Windows 95/98/NT/2000/ME/CE, Apple, Linux, Palm OS, etc.

U.S. Pat. No. 6,129,276 from Jelen, et al. teaches a similar model to the Qode shopping model. The '276 patent teaches the use of a user terminal that has a UPC bar code scanner through which the user compiles a shopping list database. At this stage the user can selectively transmit the acquired shopping list database to a base unit located at a retailer via a network, such as the Internet. The central database can then shop for competitive products on the users shopping list, provide information on any coupons related to items on the shopping list and provide information on various options for specific products, e.g. various packaging sizes, etc. Similar problems with the Qoder apply to this patent as well, i.e. every time the consumer must connect to a central site to obtain a list of the scanned in bar codes and their description.

U.S. Pat. No. 5,884,281 from Smith, et al. teaches an electronic grocery list device which provides the consumer with a predetermined list of various common groceries from which the consumer assembles his own grocery list. The consumer's grocery list can be transmitted to a grocer via either a fax or data modem. Furthermore the consumer can print her grocery list via a printer attached to the '281. The '281 does not use a bar code scanner for input, not does it provide comparison-shopping like the '276 and Qode system do.

U.S. Pat. No. 5,483,472 from Overman teaches a portable electronic food shopper similar to a pocket calculator. The '472 does not interface with bar code scanners, or a central database, which provides other services including comparative online shopping.

An application on the Cybiko wireless appliance (www.cybiko.com) called the Grocery List provides consumers with a portable device in which to enter and carry a shopping list within. This is similar in principal to using various Personal Digital Assistants (PDAs) such as from Palm, Handspring and Psion in which a consumer can use the To Do List function to maintain a shopping list.

Consumers use newspaper advertisements to help them shop. The Sunday newspapers are usually full of ad's that help guide a consumer. Another tried and tested method to shop is by word of mouth. Consumers share information about where they have purchased items, etc.

OBJECTIVES OF THE PRESENT INVENTION

The objective is to provide the consumer with an array of convenient and easy to use choices with which the consumer is comfortable with in any variety of shopping experience. These shopping experiences include:

Routine groceries, e.g. weekly milk, bread, vegetable, etc. needs.

One-time merchandise, e.g. for gifts, clothing, etc.

Choices for taking the product in hand, i.e. delivery, pickup, etc.

DETAILED DESCRIPTION OF THE INVENTION

Figure 1:
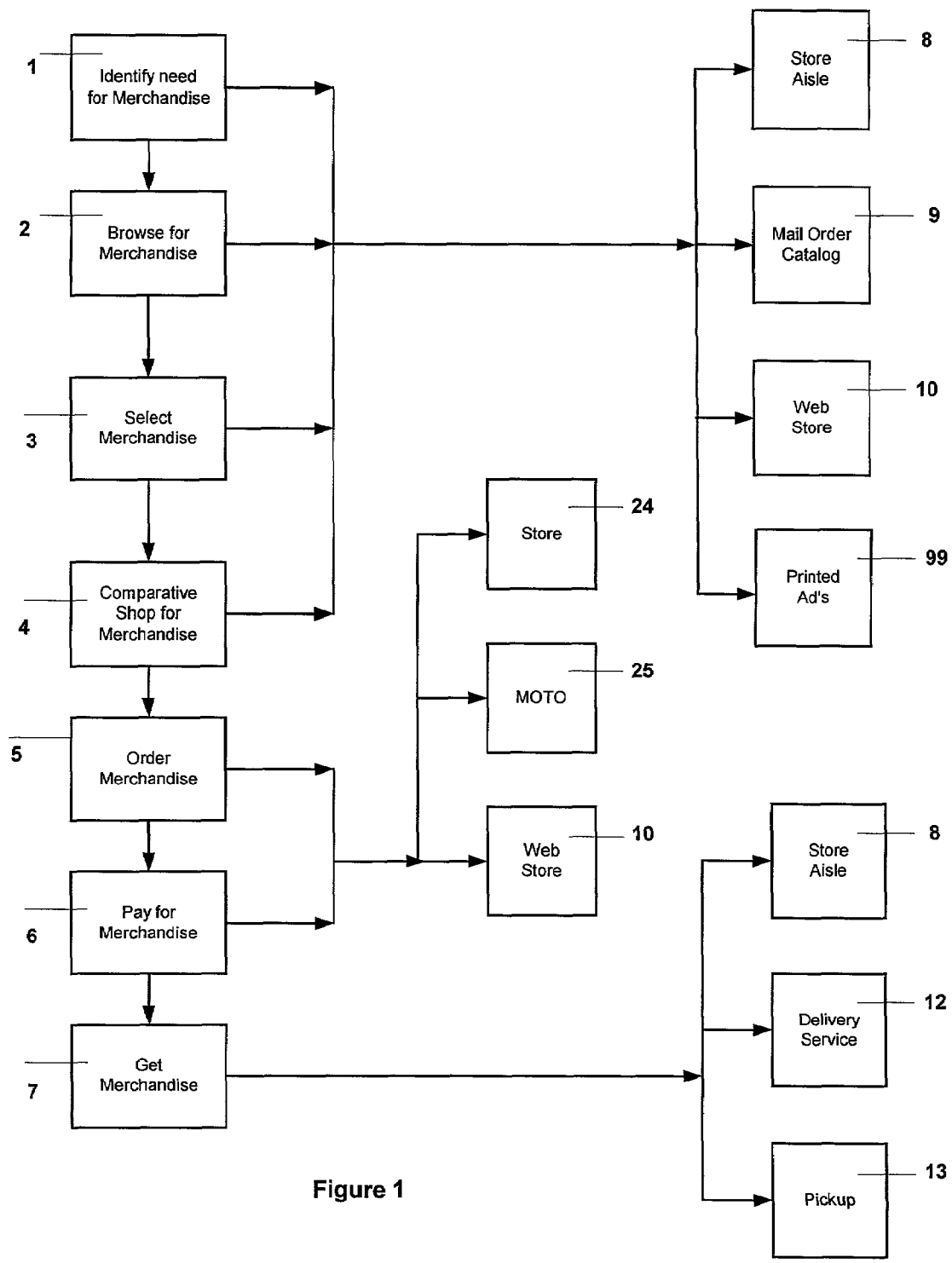
FIG. 1 is a schematic of the process that a consumer goes through when shopping for merchandise.

Before describing the preferred embodiment of the current invention, we first must consider what a consumer generally does today when shopping for any item. In FIG. 1 it can be seen that the shopping process a consumer undertakes is described Table 1:

We will now consider some of the problems that the average consumer encounters in the above shopping experience method, i.e. steps 1 through 7 as outlined in FIG. 1.

Shopping Lists

As attested in the Background of the Invention, one of the greatest hassles in shopping is remembering what you must buy. The simplest way is to write down a list of items on a piece of paper from which you cross off items as you buy them. One of the problems with this method is the case when you are compiling the list of a period of time, e.g. days. In this case you need to remember where you put your slip of paper and preferably keep it at hand wherever you are. Inspiration tends to arrive at odd and unexpected moments.

Let us consider an example in this shopping list case, i.e. groceries. It is extremely rare that a household's groceries all run out at the same time. It is more common that you run out of say broccoli sprouts on Monday evening, oranges on Monday morning, coffee on Tuesday morning, bread on Tuesday evening, yogurt on Wednesday morning, milk on Thursday,

TABLE 1

General Consumer's Shopping Experience Process
The Average Shopping Experience

| Process Step | Process Step Description |
|---|---|
| 1. | The consumer identifies a need for the merchandise 1. This could simply be the fact that a family member or friend's birthday is fast approaching, or it could be the fact that the consumer has thrown out an empty milk container and he is dying for a cup of coffee with milk. |
| 2. | Once a need for an item has been identified 1, the consumer usually browses for the merchandise. This can be done in a store aisle 8, in a mail order catalog 9 or on a web site 10 on the Internet. Some consumers use the newspaper ad's 99 to browse for merchandise. |
| 3. | The next step in the shopping experience is to select the merchandise 3 that the consumer wishes to acquire. Once again, this can be done in a store aisle 8, in a mail order catalog 9 or on a web site 10 on the Internet. |
| 4. | At this stage, the consumer has in mind what he is looking for. The next step is usually to comparative shop for the item 4. For example, if the consumer is in a store, then the consumer will search various shop aisles 8 for similar products that are cheaper; or may have different features for the same price. Similarly, a consumer may browse through more than one mail order catalog 9 and locate a similar item that was selected 3. It is relatively common for a web store 10, e.g. buy.com or pricewatch.com, to locate similar items as the one selected by the consumer 3. |
| 5. | Finally the consumer decides to get the merchandise, i.e. to order merchandise 5. Depending on the type of shopping that the consumer is doing, this could be either in a store 24 (i.e. what's called these days a 'brick-and-mortar' store), via the telephone and MOTO 25, or on the Internet via a web store 10. |
| 6. | The next step is to pay for the merchandise 6. Depending on which shopping model the consumer is engaged in; this step can be one of the following payment forms;<br>a. Cash,<br>b. Check,<br>c. Credit card,<br>d. Cash on delivery (COD), or<br>e. Money order.<br>Generally in a store 24, the consumer will pay by credit card, check or cash. For a MOTO 25 transaction the consumer usually uses a credit card, but sometimes uses COD. Shopping online at a web store 10, the consumer will generally pay using a credit card. Other forms of payment methods have attempted to be incubated on the Internet 23, e.g. cybercash (e.g. U.S. Pat. No. 6,061,665 issued to Bahreman et al. and U.S. Pat. No. 5,815,657 issued to Williams et al.), but none have caught on to date. |
| 7. | The final step, ignoring for the moment a 'normal' shopping experience of returning purchased merchandise, is to get the merchandise 'in hand' 7. The consumer generally has a choice of taking the merchandise from the store aisle 8, having the merchandise delivered 12 or picking up the merchandise 13. Generally in this embodiment, pickup 13 is considered as a drive-through pickup, similar to drive-through banks, fast food stores, etc. The pickup 13 methodology is discussed further in Table 4. | fish on Friday, etc. Sure you can keep a running list of items as they run out and some people attach the list to a magnet on the fridge. Now that's ok for items that are kept in the kitchen. What happens when you need household items outside of the kitchen? For example, if a consumer's washing machine is in his basement. What happens when he needs washing powder or bleach? If he is keeping a shopping list on his fridge, the consumer needs to remember that he needs washing powder and bleach the next time he is in the vicinity of the master list.

Let us now consider another shopping list case, e.g. Christmas gift shopping. Sometimes we know exactly what we want to buy people for Christmas, but often we don't have a clue except when we see something in a store or in a catalog. At the time we see the item, we may not be ready to buy it, perhaps because we believe that we can get a better price somewhere else, or perhaps we hope that another item may be more inspirational. But, we should note the item's price and who's selling it. Once again the tried and tested method is a pen and paper. The more organized shopper may have a diary/planner in which she writes this information. On the other hand, she may be open to high tech and may use a PDA 20. Yet again, the consumer may simply rely on her memory. The problem with the pen and paper is that the consumer may loose or misplace the piece of paper. It's also a bit of a hassle to write down all of the item's details. The problem with the PDA 20 is that you have to lug it around with you and then manually enter the pertinent information. It's another unseemly bulge in a man's pocket and further clutter in a woman's wallet. A person's memory is generally not 100% reliable and hence as we've all experienced the situation—"where did I see that really cool and reasonable thingy for Mom?".

Shopper's Barcode Scanner

Figure 2:
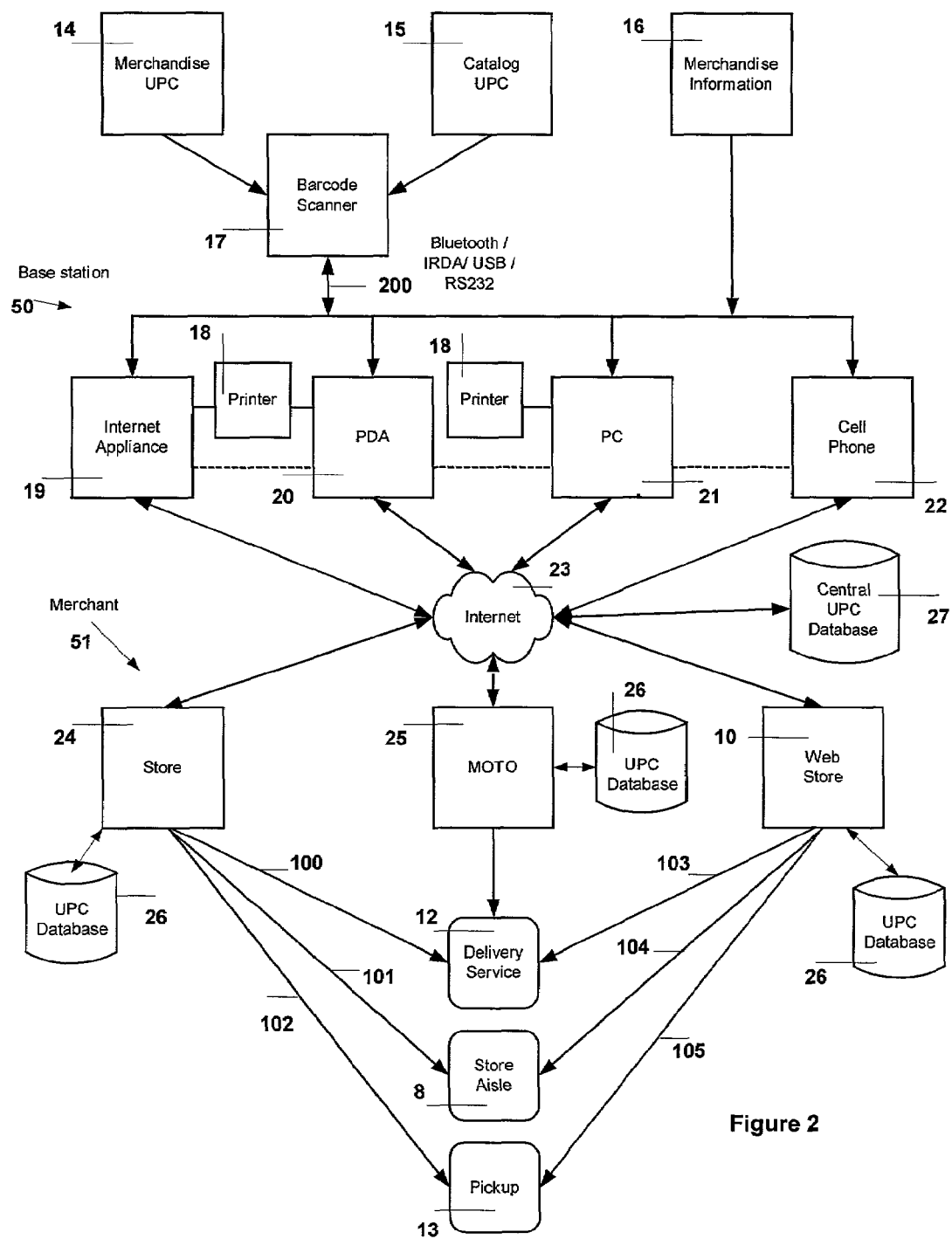
FIG. 2 is a schematic of the invention's preferred embodiment of the shopping process outlined in FIG. 1.

Referring to FIGS. 1 and 2, the preferred embodiment of the invention solves this problem, i.e. maintaining the shopping list, with the following method and system. The consumer primarily uses a small wireless bar code scanner 17 that he uses to scan in merchandise UPCs 14 and or catalog UPCs 15, depending on whether he is shopping via a store 24, MOTO 25 or on a web store 10. For purposes for brevity, newspaper ad's 99 are included in the grouping of merchandise catalogs. The wireless bar code scanner 17 could for example be the Qoder from Qode, or the CS 1504 Consumer Memory Scanner from Symbol Technologies.

This means that (a) mail order catalogs/newspaper advertisements 99 need to include UPC barcodes and (b) web pages need to include UPC barcodes as well, that can be scanned, or transferred, to the barcode scanner 17.

The barcode scanner 17 need not necessarily be a portable device that is homed via a magnet on the fridge door. It could, for example, be incorporated (i.e. fixed) into the fridge door itself as proposed by a number of home appliance manufacturers, or it could be part of the trashcan. GE revealed such a kitchen appliance, i.e. a refrigerator, in a press release titled "GE Appliances Reveals Consumer Benefits of Concept Smart Appliances", Apr. 6, 2000, PRNewswire.

If the scanner 17 is part of, say the lid of a trash can, then as the consumer discards an empty item, she could easily scan the UPC. The problem with fixed barcode scanners 17 is that there are numerous situations in which a portable barcode scanner 17 is needed. For example, consider the scenario where goods are not stored in the fridge, but are stored in various cupboards and in the pantry. The preferred embodiment uses a portable barcode scanner 17, but envisages consumers using fixed appliance barcode scanners as well. Furthermore, the consumer may also have multiple portable bar code scanners 17. The key to multiple scanners 17 is that they need to communicate 200 with a base station 50. This function 200 is considered later in the description of the preferred embodiment.

The scanned in UPCs need to be interpreted by a more intelligent device, i.e. a base station 50, for example an Internet Appliance 19, or a PDA 20, or a PC 21 or a cell phone 22. Examples on the marketplace of Internet Appliances 19 include the Touch Pad from Gateway and the iPAQ from Compaq. Examples of PDAs include the Palm from Palm Inc., the Visor from Handspring and similar devices from Psion and other companies. The realm of UPCs and their description consist of a huge database, i.e. millions upon millions of products. To store this size of database on a PDA 20, etc. is not a good idea, because a primary reason being that products are constantly added and removed from the UPC system. Hence it would be a huge task to update all of the UPC databases on each and every consumer's intelligent device. It is a better solution to centralize this task as Qode and the '276 from Jelen, et al. have done. The preferred embodiment implements a similar scheme to resolve bar codes in which central databases are maintained by the merchandise store 24, the MOTO 25 vendor and the web store 10, i.e. the merchant 51. In FIG. 2, another model is shown to resolve the UPCs, i.e. a centralized UPC database 27, that holds all known UPCs.

The Uniform Code Council, Inc. (UCC) is a not-for-profit organization that provides standards and processes in the bar code industry. UCC also assigns unique blocks of bar codes to a company. UCC (www.uc-council.org) has over 850,000 member companies that are using the EAN.UCC Systems standards. The UCC could potentially be a candidate for the Central UPC Database 27.

After transmitting 200 the UPCs that the consumer is considering to a base station 50 that can import the UPCs stored on the bar code scanner 17, the base station 50 connects via the Internet 23 to the UPC database stored at the merchant 51, or at the Central UPC Database 27, to download the textual description of the UPC that the consumer had scanned into her bar code scanner 17. Coupons (i.e. e-coupons) and other information can also be downloaded at this instant. This is the method whereby the consumer maintains her shopping list in whichever device she is most comfortable with, i.e. her Internet Appliance 19, her PDA 20, her PC 21, her cell phone 22, etc. The preferred embodiment of the invention allows the consumer to share her various shopping lists on multiple devices, i.e. base stations 50. More about this feature later in the detailed description of the preferred embodiment.

A word about e-coupons based on an article in Business Week magazine titled "Penny-Pincher's Paradise", Jan. 22, 2001: in the US approximately 256 billion coupons are distributed annually. Currently less than 1% is distributed as e-coupons and Sunday newspapers distribute about 80% of coupons. Only 1.2% of Sunday newspaper coupons are redeemed, whereas 57% of e-coupons are redeemed. According to a report by the NPD Group Inc., grocery e-coupons are the most popular accounting for a redemption rate of 59%, followed by books with 32%, health products 30% and music products with 26%. Today web sites such as coupons.com and coolsavings.com allow a consumer to print a coupon and redeem it at a local store. The preferred embodiment provides the means for a consumer to scan the e-coupon and other coupons into a barcode scanner 17, which is then made available via a base station 50 for redemption.

The preferred embodiment's barcode scanner 17 includes firmware such that UPC descriptions can be stored and displayed on the device. This allows the consumer to take the barcode scanner on a shopping expedition, e.g. to a store 24. As is indicated in FIG. 2, the communication link 200 between the scanner 17 and the base station 50 is bi-directional. This enables UPC descriptions and e-coupons to be uploaded and stored in the scanner 17. This feature is configurable by the consumer, either as a system default, or on an as-needed basis. Furthermore features are provided on the scanner 17 such that the consumer can scroll through the list of items stored in the device, select an item and mark it as purchased, etc. An indicator is also provided on the scanner 17 that informs the consumer when the UPCs were transmitted 200 to a base station 50, and the identity of that base station 50. Various consumer product manufacturers are incorporating a barcode scanner into their products, e.g. the CSM 150 Bar Code Scanner for the Handspring Visor PDA 20, which is produced by Symbol Technologies.

There could be circumstances in which scanning in a bar code is not optimal. In this situation the consumer may have to manually enter the bar code number into the scanner 17, or base station 50. Adding a numeric keypad to the scanner 17 increases the consumer's product cost. The preferred embodiment of the invention does not incorporate a keypad on the scanner 17, but in place uses a selectable menu of numbers from which to choose from. The user interface is via four arrow keys, i.e. "up", "down", "left" and "right" movements. An example of this system interface is the COMAND system from Mercedes, which provides the consumer with vehicle GPS navigation.

Another form of product identification technology is evolving and the preferred embodiment does not exclude the incorporation of this technology if and when it becomes an industry standard. This technology is being developed by Motorola in partnership with International Paper and has been dubbed "smart cardboard". Basically this technology involves embedding a cheap chip (projected cost between 10 cents and 30 cents) that employs a capacitive technique called BiStatix to operate an electronic tag. An article titled "'Smart' Cardboard Ready To Roll"; Nov. 3, 2000 provides greater details on this technique and can be found on the TechWeb site (www.techweb.com)

Communications and Networking

Let us now consider the data transmission medium, i.e. networking. Today the most common form of media transmission is via a fixed cable. For example, via RS232 to a serial port or keyboard port on a base station 50. The Qoder implemented a device attached to the keyboard port on a PC 20. Another common way is via a USB, parallel or FireWire (i.e. the IEEE 1394 standard) port on a base station 50. PDA 20 devices use serial and USB cable interfaces and also use infra-red (IRDA) transmission between other PDAs. A new technology that is beginning to appear in the marketplace is one called Bluetooth. A consortium of companies including 3COM, Eriksson, IBM, Intel, Microsoft, Nokia, Toshiba, Lucent Technologies and others developed Bluetooth (www-.bluetooth.com).

Bluetooth wireless technology is a low-cost, low-power, short-range radio frequency (RF) link for mobile devices and for Local Area Network (LAN) access points. It offers fast and reliable digital transmissions of data over the globally available 2.4 GHz ISM (Industrial, Scientific and Medical) bandwidth. Bluetooth uses the spread-spectrum wireless technique that maps out all of the unused frequencies within its assigned frequency bandwidth and then spreads information over available frequency slots. Bluetooth increases or decreases the strength of its transmission signal according to how far away the receiver is, thereby saving power, which is especially important in portable devices such as the preferred embodiment's bar code scanner 17. Bluetooth encrypts the signal and also uses frequency hopping to reduce the possibility of signal interference and interception. This is important in densely populated areas so that information remains private and available.

A key feature of Bluetooth for incorporation into the invention's preferred embodiment, is the special way in which it scans its surrounding area, which is normally a sphere of about 10 meters, looking for devices that are in range and checking their identification and access privileges. When Bluetooth finds compatible devices, it establishes an ad-hoc network called a piconet. Hence after scanning in a merchandise UPC 14, or a catalog UPC 15 into the barcode scanner 17, the scanner 17 using Bluetooth automatically checks to see if a registered base station 50 is within 30 feet of it. Registration implies that the base station 50 has been granted access privileges, and visa versa, with the bar code scanner 17. The barcode scanner 17 transmits any UPC that is currently stored in its memory to the available base station 50. It is possible that the consumer could manually initiate the transmission of information 200 from the scanner 17 to the base station 50 if this feature was incorporated into the barcode scanner 17. The preferred embodiment allows the scanner 17 to automatically scan its perimeter for available base station 50 devices and to then transmit 200 any available UPCs that it has stored.

What this means for the preferred embodiment, is that no cables need to connect the bar code scanner 17 to any of the base station 50 devices. Furthermore, provided that all of the base station 50 devices are Bluetooth enabled, then they can communicate amongst themselves via a Bluetooth piconet. One advantage of this system is that copies of a shopping list can be resident and kept in synch on multiple base stations 50. This multiplicity of synchronized copies is maintained without the consumer's intervention, provided that each base station 50 is configured to synchronize data with each other.

Another advantage of a piconet is that any peripheral device attached to a base station 50, in effect becomes a peripheral to any other base station 50 on the piconet. For example, the consumer can print out a shopping list stored on his PDA 20 on a USB interface printer 18 that is attached to a PC 21, even if the printer 18 is not Bluetooth enabled.

Currently Ericsson Mobile Communications AB has a systems development kit (SDK) called "The Bluetooth Tool Kit/The Bluetooth Application and Training Tool Kit" and "The Bluetooth Development Kit". Lucent Technologies produces a Bluetooth Transceiver Module, i.e. a chip set to be incorporated, e.g. in the various base stations 50. Toshiba released a device called the Toshiba Bluetooth PC Card that enables PCs to communicate over a Bluetooth piconet.

Local UPC Database

A process running on the base station 50 stores the transmitted 200 UPCs in a local database. The local UPC database (LUD) eliminates duplicate UPCs, but records the date and time which it received the UPC. Table 2 illustrates the record structure of the LUD.

TABLE 2

Local UPC Database (LUD) Record Structure

| Field Name | Definition | Data Type |
|---|---|---|
| UPC | Uniform Product Code | Integer |
| Description | UPC merchant product description | String |
| Quantity | Number or measure (e.g. 2.5 lbs of flour or 12 eggs) of items interested in | Decimal |

TABLE 2-continued

Local UPC Database (LUD) Record Structure

| Field Name | Definition | Data Type |
|---|---|---|
| Price | Cost of UPC item | Decimal |
| Merchant | Name of UPC supplier, e.g. Safeway, Amazon.com, etc. | String |
| Date/Time | Date and time at which this record was entered into the database | Integer |
| Category | Consumer UPC categories, e.g. Groceries, Gifts, Books, Music, Clothing, etc. | String |
| Comments | Free text for consumer information, e.g. "grandpa birthday". | String |

It is a possible embodiment of the invention such that a third party provides merchants with the lookup and maintenance of the UPC database 27, which is then accessible by consumers. This implementation falls in line with the business-to-business (B2B) model that is taking root in the business world today. This third party could also provide competitive product information for the UPCs. General store web sites on the Internet, e.g. buy.com and pricewatch.com provide this type of service.

To illustrate how the LUD system works, let us consider the shopping scenario in which a consumer needs to replenish his groceries. The preferred embodiment of the invention enables the consumer to implement the following methodology as outlined in Table 3.

TABLE 3

Preferred Embodiment's Grocery Shopping Experience Process
The New Shopping Experience

| Process Step | Process Step Description |
|---|---|
| 1. | When either the grocery item has run out or needs to be restocked shortly, the consumer uses his barcode scanner 17 and scans in the UPC on the item in question. For example, the consumer's milk supply is down to a pint and will run out after a day's quota of coffee. The consumer simply scans in the milk container's UPC. Similarly, the consumer would scan in the UPC for other groceries, e.g. eggs, bacon, coffee, tomatoes, chocolate, etc. |
| 2. | As mentioned previously the preferred embodiment's communication system automatically transmits this information 200 to any Bluetooth enabled base station 50 that has been authorized to accept this information, provided it is within a 10 meter radius of the scanner 17. If no base station 50 is within the perimeter of the scanner's Bluetooth capability, the consumer simply walks with the barcode scanner 17 in-hand to where the base station 50 is located, thereby bringing the base station 50 within the communications perimeter of the scanner 17. The scanned UPCs are automatically uploaded 200 into the base station 50. If no base station 50 can be located in the Bluetooth perimeter, then the scanner 17 indicates this predicament. |
| 3. | The base station 50 then determines if it needs to acquire the Uniform Product Code's Description (see Table 2) from the merchant's UPC Database 26, or the Central UPC Database 27. This is done by checking whether or not the uploaded 200 UPC already exists in the base station's Local UPC Database (LUD). If the UPC already exists in the LUD and has pertinent associated data, then the base station 50 does not attempt to retrieve other data about the UPC. The new Date/Time (see Table 2) is noted in the LUD for the relevant UPC. If the UPC does not exist in the LUD, then the base station 50 retrieves pertinent information from the UPC Database 26 or 27. |
| 4. | Depending upon how the consumer wants to shop, any of the following steps can be implemented: |
| 4.1. | If a printer 18 is attached to the base station 50, and is Bluetooth enabled, the consumer's grocery list can be printed out. If a non-Bluetooth printer is attached to a base station 50, then the list can also be printed out. |
| 4.2. | If the consumer likes to shop in a store 24 using her PDA 20, then she simply goes to the store 24 with her PDA 20, because the grocery list has been loaded in a LUD on the device from step [2.] above. |
| 4.3. | If the store 24 that the consumer shops at provides a method to receive the consumer's shopping list, then the consumer would send the list from her base station 50, e.g. her PC 21, or cell phone 22, or Internet Appliance 19, etc. which is connected to the Internet 23. Note that the consumer could send her shopping list to multiple stores ('both 'brick and mortar' 24 and online 10 stores) to obtain price comparisons and product information. |
| 4.4. | Another form of transmitting the shopping list to a store 24 is by fax, or dial-up modem. These options are not shown in FIG. 2. |
| 5. | The next step in the shopping experience is to shop for the groceries. Depending upon which method the consumer elected to do in step [4.] above, the consumer can implement any of the following methods: |
| | 5.1. The consumer can simply take the barcode scanner 17 to the store 24. In the store 24, the display on the scanner 17 displays the item to be purchased, i.e. it is the consumer's shopping list. The consumer can: |

TABLE 3-continued

Preferred Embodiment's Grocery Shopping Experience Process
The New Shopping Experience

| Process Step | Process Step Description |
|---|---|
| | 5.1.1. Scan the item's UPC to "cross off" the item from the list. |
| | 5.1.2 If the scanner 17 provides the interface, the consumer can highlight the item and mark the item as purchased. |
| | 5.1.3. Simply make a mental note that the item has been purchased. |
| | 5.2. If step [4.1] above was chosen, then the consumer takes the printed grocery list to the store 24 and shops for the items in the store aisles 8. |
| | 5.3. If step [4.2] above was chosen, then the consumer takes her PDA 20, which contains the selected grocery list to the store 24 and shops for the items in the store aisles 8. This process is illustrated by arrow 101 in FIG 2. |
| | 5.3. If step [4.3] was chosen, then the consumer can implement any of the following, provided that the specific service is offered by the store 24: |
| |     5.3.1. The grocery list is picked out and packed by the store 24 for delivery 12 to the consumer. This process is illustrated by arrow 100 in FIG. 2. |
| |     5.3.2. The grocery list is picked out and packed by the store 24 for pickup 13 by the consumer. This process is illustrated by arrow 102 in FIG. 2. |
| |     5.3.3. The grocery list is uploaded into a store's base station 50, which can then be transmitted upon consumer identification, to a cart enabled with the relevant technology, e.g. as described in '276 patent from Jelen et al. The preferred embodiment does not implement this methodology, but it is a possible embodiment. |

For items that are ordered on a regular basis, the preferred embodiment applies the following methodology. Either the base station 50, or a 'smart' bar code scanner 17 maintains frequently entered items in a Local UPC Database (LUD). The system tracks the frequency that the consumer enters the items into the LUD. Obviously a fair of amount of memory is needed to keep track of item frequency, hence this method would only be available in a base station 50 that has the required memory, and e.g. a PC 21 would be an ideal candidate for implementing such a methodology. Once an ordering pattern has been established, the base station 50 can be configured to either (a) order, or (b) print out the regular items. In the U.K. the milkman delivers to the consumer's doorstep regularly consumed dairy products, as well as bottled water and soda.

Payment

Besides the conventional methods of payment that is currently accepted in the shopping trades, a relatively new method of payment is also incorporated in the preferred embodiment. Banks and credit-card issuers (e.g. American Express, MasterCard, Visa) are trying to encourage the adoption of a new system called Secure Electronic Transaction SET (U.S. Pat. No. 5,790,677). On Aug. 4, 1998 the '677 patent was granted to Fox et. al. and assigned to Microsoft Corporation. It is a good invention that uses digital certificates to validate all parties involved in the electronic transaction and encrypts credit card information and other financial data prior to transmission on a network.

To date, SET has not been adopted to any critical mass either by merchants 51 or customers. A list of merchants that have adopted the SET protocol can be seen on the Internet, e.g. for Visa SET merchants at www.visa.com/nt/ecomm/shopping/set_merchants.html and MasterCard SET merchants at www.mastercard.com/shoponline/set/bycountry.html. As can be seen from these merchant lists, most of the SET registered merchants are based in Europe and currently the total number is less than 1000. No indication is given as to how many customers use SET, although given the age tested economic principles of supply and demand, the fact that the number of merchants using SET is relatively low, it is a fair indication that too few consumers use SET. On these listed web sites it can be seen that very few US merchants are SET enabled. Today the US merchants 51 on the Internet prefer to use Secure Sockets Layer (SSL). SSL only guarantees that data is safely (i.e. encrypted) transmitted between the customer and the merchant. It does not guarantee that the data will be electronically stored and handled safely by the merchant 51. Furthermore financial information that the merchant 51 does not need to see is visible. An example of information that the merchant does not need to see is the customer's credit card number. Practically all that the merchant needs to be concerned with is that he will be paid for the merchandise that he is selling to the customer and the customer's shipping address. This visibility of financial information could lead to abuse. The primary payment methods 6 in the preferred embodiment are detailed in Table 1, step [6.]. When SET gains market acceptance, the preferred embodiment will incorporate this payment methodology.

Delivery

MOTO 25 and web store 10 items are usually delivered delivery service 12, e.g. via UPS, FedEx, the US Postal Service, etc. In the grocery domain, as mentioned previously a similar model is available to consumers, but currently these companies, e.g. Webvan, are struggling to become profitable ("Cash Supply Shrinks While Webvan Losses Continue", The Wall Street Journal, Jan. 25, 2001).

The preferred embodiment of the invention offers an alternative delivery service, i.e. pickup 13. Continuing to use the grocery shopping method as an example, this method is outlined in Table 3, step [5.3.2.], and is further expanded upon for clarification as follows in Table 4;

TABLE 4

Drive-Thru Delivery Method

| Process Step | Process Step Description |
|---|---|
| 1. | The consumer sends her shopping list to a participating grocery store. The shopping list can be sent by one of the following methods; <br>a) Fax <br>b) Web site via the Internet 23 <br>c) Email via the Internet 23 <br>Note that the method that the consumer used to create her shopping list is outlined in Table 3, steps [2] and [3]. |
| 2. | The consumer pays 6 in advance for the groceries, e.g. using a credit card. |
| 3. | A certain time period before leaving for the grocery pickup point, the consumer contacts the grocery store 24 to notify them that she is on her way. This time frame is important because the grocery store 24 requires a fixed amount of time to assemble the consumer's shopping list for pickup 13. At this moment in time the consumer cannot cancel the order. The shopping order is committed, i.e. there is no refund on payment 6 if the consumer does not pick up the packed groceries. Prior to this commitment, the consumer could cancel the order either by contacting the grocery store 24, or simply by not making the commitment call. In the case of a cancellation, the consumer's payment 6 (step [2.] above) is also cancelled, or refunded. |
| 4. | The grocery store 24 picks and packs the groceries in order to meet the consumer's committed pick up time of arrival. The preferred embodiment includes the option for the store 24 to provide the means to notify the customer that her order is ready for pickup 13, e.g. a message to her cell phone 22, an email message to her wireless PDA 20, etc. |
| 5. | The consumer drives to her participating grocery store and goes through the drive-through pickup line to collect her groceries. As with any pickup situation, the consumer is asked for a form of identification to prevent fraudulent abuse of the system. |

What is claimed:

1. A method for creating a consumer's shopping list prior to entering a store, comprising the steps of:

(a) using a portable barcode scanner;

(b) scanning a needed product barcode or a needed product coupon barcode using said portable barcode scanner prior to entering to said store;

(c) using one or more consumer's first computers comprising the steps of;

(i) receiving data from, and transmitting data to, said portable barcode scanner over a consumer's first network infrastructure;

(ii) storing said data in a memory means on said first computer as a current shopping list under control of each said product barcode or each said product coupon barcode and under control of a date and time; wherein said date and time indicative of when each said product barcode or each said product coupon barcode was scanned by said portable barcode scanner;

(iii) communicating with a second computer system using said first computer, over a second network infrastructure to request and to receive additional shopping list information based on each said product barcode or each said product coupon barcode;

(iv) collecting and storing a multiplicity of said dates and times that each said product barcode has been scanned by said portable barcode scanner and stored in said first computer memory means; wherein said collecting and storing of said multiplicity of dates and times providing a means to learn said consumer's rate of consumption of each said product; wherein said means of learning said consumer's rate of consumption of each said product is a consumption tracking frequency of each said product; said consumption tracking frequency of each said product providing a means to predict when each said product needs to be replaced;

(v) providing a specific notification of previous shopping list information stored in said first computer's memory without needing a current scanned entry of one or more barcodes associated with said previous shopping list information, wherein said specific notification occurring at a date and time when said consumer creates said current shopping list; said notification provided by said means to predict when each said product needs to be replaced;

(vi) adding automatically a list of one or more products stored in said previous shopping list information to said current shopping list commensurate with said means to predict when each said product needs to be replaced at said date and time of creating said current shopping list;

(vii) displaying a multiplicity of said product barcodes or said product coupon barcodes, together with additional shopping list information, on said consumer's first computer display;

(viii) indicating on said first computer display that said consumer has obtained said current shopping list in-hand from said consumer's first computer; and (ix) indicating that said data transmitted to and said data received from said portable barcode scanner has been successfully sent and received;

(d) transferring each said scanned product barcode or each said product coupon barcode to said consumer's first computer, over said first network infrastructure from said portable barcode scanner;

(e) storing each said transferred product barcode or each said product coupon barcode in a shopping list database on said consumer's first computer, said shopping list database includes other product information, wherein said other product information includes: a product description, a product cost, a date and time on which each said product barcode or each said product coupon barcode was scanned by said portable barcode scanner and an indicator for a required quantity of each said product;

(f) obtaining in-hand said stored current shopping list from said consumer's first computer in order to go to a first store and purchase products listed on said current shopping list, said obtaining in-hand is selected from the group comprising:
  (i) printing said stored current shopping list on a printing device attached to said consumer's first computer,
  (ii) transferring said stored current shopping list to a consumer's portable computer device, and
  (iii) using said portable barcode scanner, (g) using said first computer comprising an optional step of either:
  (a) sending said current shopping list from said consumer's first computer to a second store connected to said second network infrastructure, said second store shipping products listed on said current shopping list to said consumer, thereby not requiring said consumer to shop in-store for said products; or
  (b) sending said current shopping list from said consumer's first computer to a second store connected to said second network infrastructure, said second store making said products listed on said current shopping list available to said consumer for pick up, thereby not requiring said consumer to shop in-store for said products.

2. The portable barcode scanner of claim 1, wherein said first network infrastructure is a wireless link between said portable barcode scanner and said consumer's first computer; wherein said wireless link is selected from the group comprising: an infrared link and a Bluetooth-enabled radio-frequency link.

3. The portable barcode scanner of claim 1, wherein said first network infrastructure is a wired link between said portable barcode scanner and said consumer's first computer; wherein said wired link is selected from the group comprising: an RS-232 link, a USB link, a parallel link and an IEEE 1394 link.

4. The first computer of claim 1 is selected from the group comprising: a personal computer, a personal digital assistant, an internet appliance, and a cell phone.

5. The first computer of claim 1, wherein said second network infrastructure is the internet.

6. The portable computer device of claim 1 is selected from the group consisting: a personal digital assistant and a cell phone.

7. The shopping list of claim 1 is selected from the group comprising: beauty aids, books, clothing, computer hardware, computer software, computer supplies, drugs, footwear, groceries, gifts, health aids and music.

8. A method for creating a consumer's shopping list prior to entering a store, comprising the steps of:
  (a) using a portable barcode scanner;
  (b) entering manually a needed product barcode or a needed product coupon barcode using said portable barcode scanner prior to entering to said store;
  (c) using one or more consumer's first computers comprising the steps of;
    (i) receiving data from, and transmitting data to, said portable barcode scanner over a consumer's first network infrastructure;
    (ii) storing said data in a memory means on said first computer as a current shopping list under control of each said product barcode or each said product coupon barcode and under control of a date and time; wherein said date and time indicative when each said product barcode or each said product coupon barcode was manually entered into said portable barcode scanner;
    (iii) communicating with a second computer system using said first computer, over a second network infrastructure to request and to receive additional shopping list information based on each said product barcode or each said product coupon barcode;
    (iv) collecting and storing a multiplicity of said dates and times that each said product barcode has been manually entered into said portable barcode scanner and stored in said first computer memory means; wherein said collecting and storing of said multiplicity of dates and times providing a means to learn said consumer's rate of consumption of each said product; wherein said means of learning said consumer's rate of consumption of each said product is a consumption tracking frequency of each said product; said consumption tracking frequency of each said product providing a means to predict when each said product needs to be replaced;
    (v) providing a specific notification of previous shopping list information stored in said first computer's memory without needing a current manual entry of one or more barcodes associated with said previous shopping list information, wherein said specific notification occurring at a date and time when said consumer creates said current shopping list; said notification provided by said means to predict when each said product needs to be replaced;
    (vi) adding automatically a list of one or more products stored in said previous shopping list information to said current shopping list commensurate with said means to predict when each said product needs to be replaced at said date and time of creating said current shopping list;
    (vii) displaying a multiplicity of said product barcodes or said product coupon barcodes, together with additional shopping list information, on said consumer's first computer display;
    (viii) indicating on said first computer display that said consumer has obtained said current shopping list in-hand from said consumer's first computer; and
    (ix) indicating that said data transmitted to and said data received from said portable barcode scanner has been successfully sent and received;
  (d) transferring each said manually entered product barcode or each said product coupon barcode to said consumer's first computer, over said first network infrastructure from said portable barcode scanner;
  (e) storing each said transferred product barcode or each said product coupon barcode in a shopping list database on said consumer s first computer, said shopping list database includes other product information, wherein said other product information includes: a product description, a product cost, a date and time on which each said product barcode or each said product coupon barcode was manually entered into said portable barcode scanner and an indicator for a required quantity of each said product;
  (f) obtaining in-hand said stored current shopping list from said consumer's first computer in order to go to a first store and purchase products listed on said current shopping list, said obtaining in-hand is selected from the group comprising:
    (i) printing said stored current shopping list on a printing device attached to said consumer's first computer, (ii) transferring said stored current shopping list to a consumer's portable computer device, and
(iii) using said portable barcode scanner,
(g) using said first computer comprising an optional step of either;
(a) sending said current shopping list from said consumer's first computer to a second store connected to said second network infrastructure. said second store shipping products listed on said current shopping list to said consumer, thereby not requiring said consumer to shop in-store for said products; or
(b) sending said current shopping list from said consumer's first computer to a second store connected to said second network infrastructure, said second store making said products listed on said current shopping list available to said consumer for pick up, thereby not requiring said consumer to shop in-store for said products.

9. The portable barcode scanner of claim 8, wherein said first network infrastructure is a wireless link between said portable barcode scanner and said consumer's first computer; wherein said wireless link is selected from the group comprising: an infrared link and a Bluetooth-enabled radio-frequency link.

10. The portable barcode scanner of claim 8, wherein said first network infrastructure is a wired link between said portable barcode scanner and said consumer's first computer; wherein said wired link is selected from the group comprising: an RS-232 link, a USB link, a parallel link and an IEEE 1394 link.

11. The first computer of claim 8 is selected from the group comprising: a personal computer, a personal digital assistant, an internet appliance, and a cell phone.

12. The first computer of claim 8, wherein said second network infrastructure is the internet.

13. The portable computer device of claim 8 is selected from the group consisting: a personal digital assistant and a cell phone.

14. The shopping list of claim 8 is selected from the group comprising: beauty aids, books, clothing, computer hardware, computer software, computer supplies, drugs, footwear, groceries, gifts, health aids and music.

15. A barcode scanning system for aiding a consumer in creating a new shopping list to which products are automatically added based in part on previously entered shopping lists, said automatically added products not having been considered by said consumer at a date and time of creating said new shopping list, said barcode scanning system comprising:
(a) a portable barcode scanner with a means to scan a product's barcode prior to entering a store;
(b) one or more consumer's first computers connected to said portable barcode scanner over a first network means, wherein said first computer includes a means to store in a memory means one or more barcodes and one or more dates and times that said one or more barcodes were scanned, said barcodes and said dates and times received over said first network means from said barcode scanner in order to create said new shopping list, and wherein said first computer includes a means to store said received barcodes in said memory means comprising barcodes previously received from said barcode scanner;
(c) a computer program in said first computer, wherein said computer program enables collecting and storing of a multiplicity of said dates and times that each said product barcode has been scanned by said barcode scanner and stored in said first computer memory means, received over said first network means; wherein said collecting and storing of said multiplicity of dates and times providing a means to learn programmatically said consumer's rate of consumption of each said product; wherein said means of programmatically learning said consumer's rate of consumption of each said product is a consumption tracking frequency of each said product; said consumption tracking frequency of each said product providing a means to predict programmatically when each said product needs to be replaced;
(d) wherein said computer program providing a specific notification of previous shopping list information stored in said first computer's memory without needing a current scanned entry of one or more barcodes associated with said previous shopping list information, wherein said specific notification occurring at a date and time when said consumer creates said new shopping list; said notification provided by said means to predict programmatically when each said product needs to be replaced;
(e) wherein said computer program enables automatically adding a list of one or more products stored in said previous shopping list information to said new shopping list commensurate with said means to predict programmatically when each said product needs to be replaced at said date and time of creating said new shopping list;
(f) one or more second computers connected to said first computer over a second network means, wherein said second computer includes a means to receive said barcodes from said first computer over said second network means, as well as wherein said second computer includes a means to send product information about said barcodes to said first computer;
(g) a printer attached to said consumer's first computer, wherein said printer prints said new shopping list for said consumer; and
(h) a portable computing device with a means to receive said new shopping list from said first computer and a means to store said new shopping list in a memory means,
(i) wherein said first computer includes an optional means of either:
(a) sending said new shopping list from said first computer to a second store connected to said second network infrastructure, said second store shipping products listed on said new shopping list to said consumer, thereby not requiring said consumer to shop in-store for said products; or
(b) sending said new shopping list from said first computer to a second store connected to said second network infrastructure, said second store making said products listed on said new shopping list available to said consumer for pick up, thereby not requiring said consumer to shop in-store for said products.

16. The portable barcode scanner of claim 15, wherein said first network infrastructure is a wireless link between said portable barcode scanner and said consumer's first computer; wherein said wireless link is selected from the group comprising: an infrared link and a Bluetooth-enabled radio-frequency link.

17. The first computer of claim 15 is selected from the group comprising: a personal computer, a personal digital assistant, an internet appliance, and a cell phone.

18. The first computer of claim 15, wherein said second network infrastructure is the internet.

* * * * *